United States Patent [19]

Herzig et al.

[11] Patent Number: 5,719,248
[45] Date of Patent: Feb. 17, 1998

[54] SILOXANE COPOLYMERS CONTAINING VINYLOXY GROUPS, THEIR PREPARATION AND THEIR USE

[75] Inventors: Christian Herzig, Taching; Alfred Rengstl, Reischach, both of Germany

[73] Assignee: Wacker-Chemie GmbH, Munich, Germany

[21] Appl. No.: 325,232

[22] PCT Filed: May 6, 1993

[86] PCT No.: PCT/EP93/01115

§ 371 Date: Oct. 21, 1994

§ 102(e) Date: Oct. 21, 1994

[87] PCT Pub. No.: WO93/22369

PCT Pub. Date: Nov. 11, 1993

[30] Foreign Application Priority Data

May 7, 1992 [DE] Germany .................. 42 15 030.2

[51] Int. Cl.[6] .................................................. C08G 77/08
[52] U.S. Cl. .................... 528/15; 528/29; 528/31; 556/445; 522/99
[58] Field of Search ................... 556/445; 528/15, 528/31, 29; 522/99

[56] References Cited

U.S. PATENT DOCUMENTS

| | | |
|---|---|---|
| 4,292,434 | 9/1981 | Lindner et al. ............... 556/479 |
| 4,433,179 | 2/1984 | Lohse et al. ................... 568/664 |
| 4,877,854 | 10/1989 | Hattori et al. ................. 528/15 |
| 5,057,549 | 10/1991 | Herzig et al. .................. 522/99 |
| 5,145,915 | 9/1992 | Weitemeyer et al. ........... 525/403 |
| 5,166,295 | 11/1992 | Herzig ........................... 528/15 |
| 5,231,157 | 7/1993 | Herzig et al. .................. 528/15 |
| 5,241,034 | 8/1993 | Herzig et al. .................. 528/15 |
| 5,270,423 | 12/1993 | Brown et al. ................... 528/15 |

FOREIGN PATENT DOCUMENTS

| | | |
|---|---|---|
| 0046731 | 10/1984 | European Pat. Off. . |
| 0105341 | 1/1987 | European Pat. Off. . |
| 0110370 | 4/1987 | European Pat. Off. . |
| 0439777 | 8/1991 | European Pat. Off. . |
| 0439778 | 8/1991 | European Pat. Off. . |
| 0449050 | 10/1991 | European Pat. Off. . |
| 0476426 | 3/1992 | European Pat. Off. . |
| 4002922 | 8/1991 | Germany . |
| 4123423 | 1/1993 | Germany . |
| 4142327 | 6/1993 | Germany . |
| WO91/05756 | 5/1991 | WIPO . |

OTHER PUBLICATIONS

Derwent Abstract 93–206310/26.

Primary Examiner—Margaret W. Glass

[57] ABSTRACT

The invention relates to organopolysiloxane copolymers having at least one Si-bonded vinyloxy-functional group and their preparation. The compositions of the present compound crosslink particularly rapidly under light.

12 Claims, No Drawings

SILOXANE COPOLYMERS CONTAINING VINYLOXY GROUPS, THEIR PREPARATION AND THEIR USE

The invention relates to siloxane copolymers containing vinyloxy groups and to a process for their preparation. The invention furthermore relates to compositions which can be crosslinked by light and are based on siloxane copolymers containing vinyloxy groups.

Organopolysiloxanes which contain, per molecule, at least one Si-bonded vinyloxy-functional group of the formula

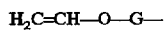
$$H_2C=CH-O-G-$$

wherein G is an alkylene radical or an alkylene radical which is interrupted by at least one divalent hetero radical, such as —O—, a divalent phenylene radical or a substituted divalent phenylene radical, or combinations of such hereto radicals, are known from EP-B 105 341. These organopolysiloxanes are obtained by preparation of a compound having an allyl and a vinyloxy group and addition of this compound onto the SiH groups of the organopolysiloxanes, hydrosilylation taking place only on the allyl group. EP-B 105 341 furthermore describes compositions which can be crosslinked by light and comprise the abovementioned organopolysiloxanes, and also onium salts which catalyse the cationic polymerisation of these organopolysiloxanes.

A silane which has one vinyloxypropyl group and at least one trimethylsiloxy group and which is obtained by hydrosilylation of allyl vinyl ether with a silane containing trimethyisiloxy groups, addition taking place on the allyl group, is known for the production of plastic lenses from Chemical Abstracts 107, 176221q.

Organopolysiloxanes which contain propenyloxy groups and siloxane copolymers which contain propenyloxy groups are described in U.S. Pat. No. 5,057,549 and CA-A 20.35 396, these compounds being prepared in a two-stage process by addition of compounds having two or more than two allyloxy groups onto SiH groups of organopolysiloxanes and subsequent conversion of the allyloxy groups into the propenyloxy groups by addition on the double bond.

Siloxane copolymers which are obtained by reaction of hydrocarbons having more than two terminal double bonds, such as 1,2,4-trivinylcyclohexane, with organopolysiloxanes containing Si-bonded hydrogen atoms in the presence of catalysts which promote hydrosilylation are described in the German Patent Application of the Applicant Company having the application number P 41 23 423.5.

Organopolysiloxanes which have any number of substituted vinyl ether groups and are prepared by hydrosilylation, that is to say by reaction of an organopolysiloxane containing SiH groups with a polyoxyalkylene ether, for example of the formula

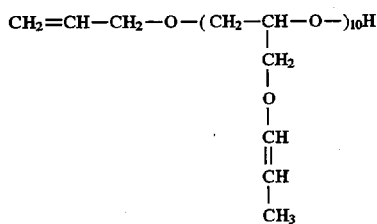
$$CH_2=CH-CH_2-O-(CH_2-CH-O-)_{10}H$$
$$\phantom{CH_2=CH-CH_2-O-(}\overset{|}{CH_2}$$
$$\phantom{CH_2=CH-CH_2-O-(CH_2}\overset{|}{O}$$
$$\phantom{CH_2=CH-CH_2-O-(CH_2-}\overset{|}{CH}$$
$$\phantom{CH_2=CH-CH_2-O-(CH_2-}\overset{\|}{CH}$$
$$\phantom{CH_2=CH-CH_2-O-(CH_2-}\overset{|}{CH_3}$$

addition taking place on the allyl group, are known from U.S. Pat. No. 5,145,915.

There was the object of providing siloxane copolymers which contain vinyloxy groups and can be prepared in a simple process, the process allowing more than one vinyloxy group to be introduced on one silicon atom and the process also enabling polyvinyloxy polymers to be obtained when divinyl ethers are employed. There was furthermore the object of providing siloxane copolymers which contain vinyloxy groups and crosslink particularly rapidly under the action of light, in particular ultraviolet light, with cationic polymerisation. This object is achieved by the invention.

The invention relates to siloxane copolymers containing vinyloxy groups and comprising (a) siloxane units of the formula

$$R_a Si(OR^1)_b O_{\frac{4-(a+b)}{2}} \quad (I)$$

wherein R denotes identical or different, optionally halogenated hydrocarbon radicals having 1 to 18 carbon atom(s) per radical, R¹ denotes identical or different alkyl radicals having 1 to 4 carbon atom(s) per radical, which can be substituted by an ether oxygen atom, a is 0, 1, 2 or 3, b is 0, 1, 2 or 3 and the sum of a+b is not greater than 3, (b) at least one unit per molecule chosen from the group comprising units of the formula

$$GR_c SiO_{\frac{4-(c+1)}{2}} \quad (II)$$

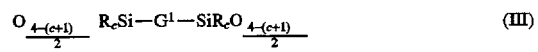
$$O_{\frac{4-(c+1)}{2}} \quad R_c Si-G^1-SiR_c O_{\frac{4-(c+1)}{2}} \quad (III)$$

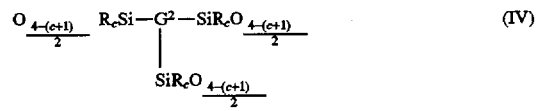
$$O_{\frac{4-(c+1)}{2}} \quad R_c Si-G^2-SiR_c O_{\frac{4-(c+1)}{2}} \quad (IV)$$
$$\phantom{O_{\frac{4-(c+1)}{2}} \quad R_c Si-}\overset{|}{SiR_c O_{\frac{4-(c+1)}{2}}}$$

and

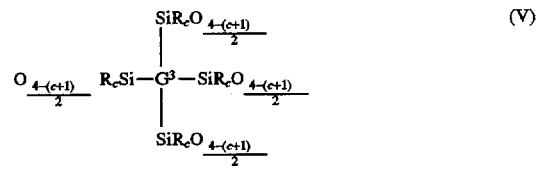
$$\phantom{O_{\frac{4-(c+1)}{2}} \quad R_c Si-}\overset{SiR_c O_{\frac{4-(c+1)}{2}}}{\overset{|}{\phantom{X}}}$$
$$O_{\frac{4-(c+1)}{2}} \quad R_c Si-G^3-SiR_c O_{\frac{4-(c+1)}{2}} \quad (V)$$
$$\phantom{O_{\frac{4-(c+1)}{2}} \quad R_c Si-}\overset{|}{SiR_c O_{\frac{4-(c+1)}{2}}}$$

wherein R has the meaning given above for this radical, c is 0, 1 or 2,

G denotes a radical of the formula

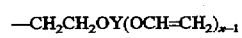
$$-CH_2CH_2OY(OCH=CH_2)_{x-1}$$

wherein

Y denotes a divalent, trivalent or tetravalent hydrocarbon radical having 1 to 20 carbon atoms per radical, which can be substituted by groups of the formula

—OH

—OR³ (wherein R³ denotes an alkyl radical having 1 to 6 carbon atom(s) per radical)

—OSiR₃⁴ (wherein R⁴ denotes a methyl, ethyl, isopropyl, tert-butyl or phenyl radical)

—OCR³
‖
O (wherein R³ has the meaning given above for this radical) or
—X (wherein X denotes a halogen atom) or can be interrupted by at least one oxygen atom, one carboxyl or one carbonyl group, and x is 2, 3 or 4, G¹ denotes a radical of the formula $$-CH_2CH_2O-Y\underset{|}{\overset{(OCH=CH_2)_{x-2}}{-}}OCH_2CH_2-$$

G² denotes a radical of the formula $$-CH_2CH_2O-\underset{|}{\overset{(OCH=CH_2)_{x-3}}{Y}}-OCH_2CH_2- \text{ and}$$
$$\phantom{-CH_2CH_2O-Y}OCH_2CH_2-$$

G³ denotes a radical of the formula $$-CH2CH2O-\underset{|}{\overset{OCH_2CH_2-}{Y}}-OCH_2CH_2-$$
$$\phantom{-CH2CH2O-Y}OCH_2CH_2-$$

wherein Y and x have the meaning given above for these symbols,
and (c) at least one unit per molecule of the formula $$O_{\frac{4-(c+1)}{2}}R_cSi-L-SiR_cO_{\frac{4-(c+1)}{2}} \quad\left[SiR_cO_{\frac{4-(c+1)}{2}}\right]_{y-2} \tag{VI}$$

wherein R and c have the meaning given above for these symbols and
L denotes a radical of the formula $$-CH_2CHR^2(CHR^2O)_u-Z-(OCHR^2)_uCHR^2CH_2-\underset{|}{\overset{[(OCHR^2)_uCHR^2CH_2-]_{y-2}}{}}$$

wherein
Z is a divalent, trivalent, tetravalent, pentavalent or hexavalent hydrocarbon radical having 2 to 20 carbon atoms per radical, which can be substituted by groups of the formula
—OH
—OR³ (wherein R³ denotes an alkyl radical having 1 to 6 carbon atoms per radical)
—OSiR₃⁴ (wherein R⁴ denotes a methyl, ethyl, isopropyl, tert-butyl or phenyl radical)

—OCR³
‖
O (wherein R³ has the meaning given above for this radical) or
—X (wherein X denotes a halogen atom) or can be interrupted by at least one oxygen atom, one carboxyl or one carbonyl group, R² denotes a hydrogen atom or an alkyl radical having 1 to 6 carbon atoms per radical, u denotes 0 or 1 and y denotes 2, 3, 4, 5 or 6.

The siloxane copolymers containing vinyloxy groups preferably comprise siloxane units of the formula (I), at least one siloxane unit of the formula (II) per molecule and at least one unit of the formula (VI) per molecule.

The invention furthermore relates to a process for the preparation of the siloxane copolymers containing vinyloxy groups, characterised in that an organic compound (1) containing vinyloxy groups, of the general formula $$Y(OCH=CH_2)_x \tag{1}$$

where Y and x have the meaning given above for these symbols, and an organic compound (2) containing aliphatic double bonds of the formula $$Z[(OCHR^2)_uCR^2=CH_2]_y \tag{2}$$

wherein Z, R², u and y have the meaning given above for these symbols,
are reacted with an organopolysiloxane (3) having on average more than one Si-bonded hydrogen atom per molecule, in the presence of a catalyst (4) which promotes the addition of Si-bonded hydrogen onto an aliphatic double bond, the organic compounds (1) and (2) being employed in amounts such that the ratio of the sum of aliphatic double bonds in the organic compounds (1) and (2) to Si-bonded hydrogen in the organopolysiloxane (3) is greater than 1.0, with the proviso that the ratio of aliphatic double bond in the organic compound (2) to Si-bonded hydrogen in the organopolysiloxane (3) is less than 1.0.

In the prior art, as in the abovementioned EP-B 105 341, neither are siloxane copolymers containing vinyloxy groups described nor was it to be expected that such copolymers can be obtained by addition (hydrosilylation) of SiH groups onto vinyloxy groups, since according to EP-B 105 341, the introduction of a vinyloxy group into an organopolysiloxane is achieved only by hydrosilylation of a compound which contains an allyl group and a vinyloxy group, the addition taking place on the allyl group.

The organopolysiloxanes according to the invention which contain vinyloxy groups preferably have a viscosity of 5 to 5×10⁵ mPa·s at 25° C., preferably 50 to 50000 mPa·s at 25° C.

The siloxane content in the siloxane copolymers according to the invention which contain vinyloxy groups is preferably 20 to 90% by weight, based on the total weight of siloxane copolymers containing vinyloxy groups.

Examples of radicals R are alkyl radicals, such as the methyl, ethyl, n-propyl, iso-propyl, 1-n-butyl, 2-n-butyl, iso-butyl, tert-butyl, n-pentyl, iso-pentyl, neo-pentyl and tert-pentyl radical; hexyl radicals, such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; cycloalkyl radicals, such as cyclopentyl, cyclohexyl and cycloheptyl radicals and methylcyctohexyl radicals; aryl radicals, such as the phenyl, naphthyl, anthryl and phenanthryl radical; alkaryl radicals, such as o-, m- and p-tolyl radicals; xylyl radicals and ethylphenyl radicals; and aralkyl radicals, such as the benzyl radical and the α- and β-phenylethyl radical. The methyl radical is preferred.

Examples of halogenated radicals R are halogenoalkyl radicals, such as the 3,3,3-trifluoro-n-propyl radical, the 2,2,2,2',2',2'-hexafluoroisopropyl radical and the heptafluoroisopropyl radical, and halogenoaryl radicals, such as the o-, m- and p-chlorophenyl radical.

Examples of alkyl radicals $R^1$ are the methyl, ethyl, n-propyl, iso-propyl, 1-n-butyl, 2-n-butyl, iso-butyl and tert-butyl radical. The methyl and ethyl radical are preferred. Examples of alkyl radicals $R^1$ which are substituted by an ether oxygen atom are the methoxyethyl and ethoxyethyl radical.

Examples of alkyl radicals $R^2$ are the methyl, ethyl, n-propyl, iso-propyl, 1-n-butyl, 2-n-butyl, iso-butyl, tert-butyl, n-pentyl, iso-pentyl, neo-pentyl and tert-pentyl radical and hexyl radicals, such as the n-hexyl radical. $R^2$ is preferably a hydrogen atom.

Examples of alkyl radicals $R^3$ are the methyl, ethyl, n-propyl, iso-propyl, 1-n-butyl, 2-n-butyl, iso-butyl, tert-butyl, n-pentyl, iso-pentyl, neo-pentyl and tert-pentyl radical and hexyl radicals, such as the n-hexyl radical.

Preferred siloxane copolymers containing vinyloxy groups are those which comprise (a) siloxane units of the formula $$R_2SiO \qquad (T),$$

(b) per molecule, at least two siloxane units of the formula $$GR_2SiO_{1/2} \qquad (II') \text{ and}$$

(c) per molecule, at least one unit of the formula $$O_{1/2}R_2Si-L-SiR_2O_{1/2} \qquad (VI)$$
$$\qquad |$$
$$[SiR_2O_{1/2}]_{y-2}$$

wherein R, G, $G^1$ and L have the meaning given above for these radicals.

If divinyl ethers (1), which are readily accessible, are employed, addition polymers which are branched by incorporation of polyfunctional ene-compounds (2) and are therefore polyfunctional can also be obtained by the process according to the invention.

Examples of the organic compound (1) which contains more than one vinyloxy group and is employed in the process according to the invention are those of the formula $$CH_2=CH-O-CH_2-CH_2-O-CH=CH_2$$

$$CH_2=CH-O-(CH_2)_4-O-CH=CH_2$$

$$CH_2=CH-O-(CH_2CH_2O)_3-CH=CH_2$$

$$CH_2=CH-O-(CH_2CH_2CH_2CH_2O)_n-CH=CH_2 \quad n=2-6$$

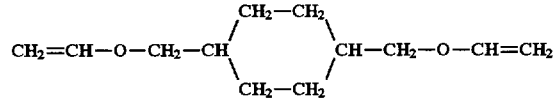

$$CH_2=CH-O-CH-CH_2-O-CH=CH_2$$
$$\qquad\qquad\qquad |$$
$$\qquad\qquad\qquad O-CH=CH_2$$

-continued $$CH_3-C(CH_2-O-CH=CH_2)(CH_2-O-CH=CH_2)(CH_2-O-CH=CH_2)$$

(shown as)
$$\begin{array}{c} CH_2-O-CH=CH_2 \\ | \\ CH_3-C-CH_2-O-CH=CH_2 \\ | \\ CH_2-O-CH=CH_2 \end{array}$$

$$CH_3-C[CH_2-O(CH_2CH_2O)_m-CH=CH_2]_3 \quad m=1-10$$

$$\begin{array}{c} CH_2-O-CH=CH_2 \\ | \\ CH_3-CH_2-C-CH_2-O-CH=CH_2 \\ | \\ CH_2-O-CH=CH_2 \end{array}$$

$$CH_3-CH_2-C[CH_2-O(CH_2CH_2O)_m-CH=CH_2]_3 \quad m=1-10$$

$$\begin{array}{c} CH_2-O-CH=CH_2 \\ | \\ HO-CH_2-C-CH_2-O-CH=CH_2 \\ | \\ CH_2-O-CH=CH_2 \end{array}$$

$$\begin{array}{c} CH_2-O-CH=CH_2 \\ | \\ CH_2=CH-O-CH_2-C-CH_2-O-CH=CH_2 \\ | \\ CH_2-O-CH=CH_2 \end{array}$$

$$(CH_2=CH-O)_2CHCH(O-CH=CH_2)_2$$

$$(CH_2=CH-O)_2CHCH_2CH(O-CH=CH_2)_2$$

and $$CH_3C(O-CH=CH_2)_3.$$

Preferred examples of the organic compound (1) are $$CH_2=CH-O-(CH_2CH_2O)_3-CH=CH_2$$

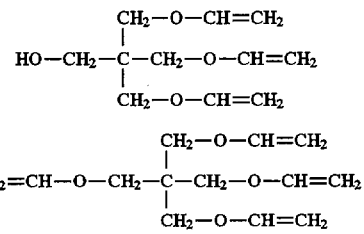

$$CH_3-C[CH_2-O-CH=CH_2]_3$$

$$CH_3-C[CH_2-O(CH_2CH_2O)_m-CH=CH_2]_3 \quad m=1-10$$

$$CH_3-CH_2-C[CH_2-O-CH=CH_2]_3$$

and $$CH_3-CH_2-C[CH_2-O(CH_2CH_2O)_m-CH=CH_2]_3 \quad m=1-10.$$

Examples of the radical Y are therefore those of the formula $$-(CH_2)_2-$$

$$-(CH_2)_4-$$

$$-(CH_2CH_2O)_2-CH_2-CH_2-$$

$$-(CH_2CH_2CH_2CH_2O)_{n-1}CH_2CH_2CH_2CH_2- \quad n=2-6$$

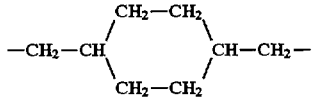

$$-CH-CH_2-$$

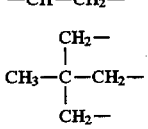

-continued

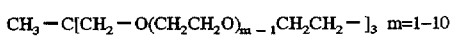 m=1-10

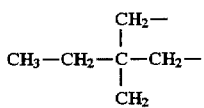

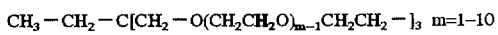 m=1-10

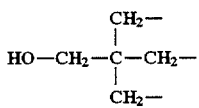

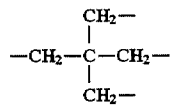

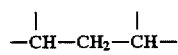

and

Processes for the preparation of the organic compound (1) are described, for example, in PCT Application WO 91/05756. The basis of the preparation is the Reppe vinylation which is known to the expert, in which alcohols are reacted catalytically with acetylene. Typical impurities of industrial vinyl ethers are vinyl ether-alcohols, which are retained as "intermediate stages" due to incomplete vinylation, and, where appropriate, secondary products thereof formed by self-cyctisation, such as, for example:

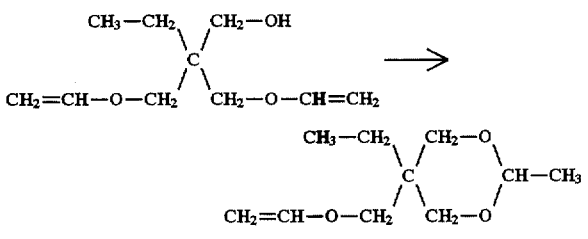

Examples of the organic compound (2) which contains aliphatic double bonds and is employed in the process according to the invention are 3,5-dimethyl-4-vinyl-1,6-heptadiene,
1,2,4-trivinylcyclohexane,
1,3,5-trivinylcyclohexane and
1,2,3,4-tetravinylcyclobutane,
1,2,4-trivinylcyclohexane being preferred, and those of the formula

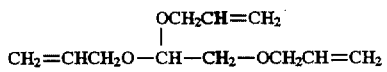

-continued

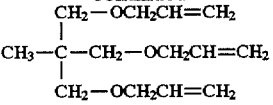

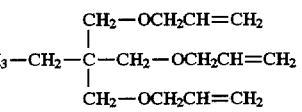

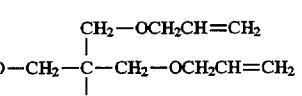

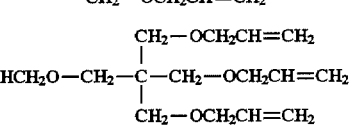

$(CH_2=CHCH_2O)_2CHCH(OCH_2CH=CH_2)_2$ $(CH_2=CHCH_2O)_2CHCH_2CH(OCH_2CH=CH_2)_2$ $CH_3C(OCH_2=CH_2)_3$ $(CH_2=CHCH_2O)CH_2[CH(OCH_2CH=CH_2)]_3CH_2(OCH_2CH=CH_2)$ $(CH_2=CHCH_2O)CH_2[CH(OCH_2CH=CH_2)]_4CH_2(OCH_2CH=CH_2)$ $(R^6O-CH_2-)_{4-k}C(-CH_2-OCH_2CH=CH_2)_k$ ($R^6$ denotes hydrogen or a radical of the formula

and k is 3), the compound mentioned last and tetraallyloxyethane being preferred examples.

Examples of the radical Z, if u in the radical L is 0, are therefore those of the formula

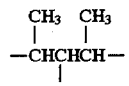

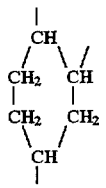

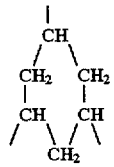

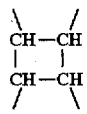

the radical of the formula

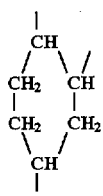

being preferred.

Examples of the radical Z, if u in the radical L is 1, are therefore those of the formula

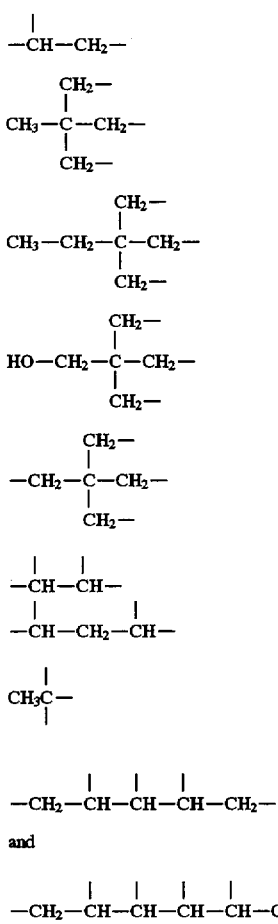

and

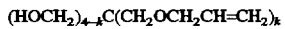

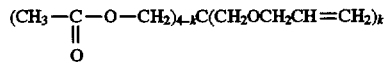

Processes for the preparation of the organic compound (2) are described in EP-B 46 731 (published on 3rd October 1984, F. Lohse et al., Ciba-Geigy AG).

The compound of the formula $$(HOCH_2)_{4-k}C(CH_2OCH_2CH=CH_2)_k$$

wherein k is on average 2.9, is commercially obtainable, for example, from Shell AG and is marketed as pentaerythritol triallyl ether. The compound of the formula $$(CH_3-\underset{\underset{O}{\|}}{C}-O-CH_2)_{4-k}C(CH_2OCH_2CH=CH_2)_k$$

is obtained by reaction of the abovementioned compound with acetic anhydride or isopropenyl acetate.

It is possible to employ one type of organic compound (1) or a mixture of at least two different types of organic compound (1) in the process according to the invention.

It is likewise possible to employ one type of organic compound (2) or mixtures of at least two different types of organic compound (2) in the process according to the invention.

Organopolysiloxanes (3) which have on average more than one Si-bonded hydrogen atom per molecule and are preferably employed in the process according to the invention are those of the general formula $$H_eR_fSiO_{\frac{4-(e+f)}{2}} \quad (VII)$$

wherein R has the meaning given above for this radical,
e is 0 or 1, on average 0.005 to 1.0,
f is 0, 1, 2 or 3, on average 1.0 to 2.5, and the sum of e+f is not greater than 3.

Organopolysiloxanes (3) which are preferably employed in the process according to the invention are those of the general formula $$H_dR_{3-d}SiO(SiR_2O)_o(SiRHO)_pSiR_{3-d}H_d \quad (VIII)$$

wherein R has the meaning given above for this radical,
d is identical or different and is 0 or 1,
o denotes 0 or an integer from 1 to 1000 and
p denotes 0 or an integer from 1 to 6.

The organopolysiloxanes (3) employed in the process according to the invention particularly preferably contain on average 2 to 4, in particular on average 2 to 3, Si-bonded hydrogen atoms per molecule.

The organopolysiloxanes (3) preferably have a viscosity of 0.5 to 20,000 mPa·s at 25° C., preferably 5 to 1000 mPa·s at 25° C.

Preferred examples of organopolysiloxanes (3) of the formula (VIII) are copolymers of dimethylhydridosiloxane and dimethylsiloxane units, copolymers of dimethylhydridosiloxane, dimethylsiloxane and methylhydridosiloxane units, copolymers of trimethylsiloxane and methylhydridosiloxane units and copolymers of trimethylsiloxane, dimethylsiloxane and methylhydridosiloxane units.

Processes for the preparation of organopolysiloxanes (3), including those of the preferred type, are generally known.

It is possible to employ one type of organopolysiloxane (3) or a mixture of at least two different types of organopolysiloxane (3) in the process according to the invention.

The organic compound (2) is employed in the process according to the invention in amounts such that the aliphatic double bond in the organic compound (2) is present in a ratio to the Si-bonded hydrogen in the organopolysiloxane (3) of preferably 0.10 to 0.95, preferably 0.30 to 0.80.

The SiH groups are present in excess in relation to the C=C groups in the organic compound (2). The aliphatic double bonds in the organic compound (2) react with the SiH groups in the organopolysiloxane (3) far more quickly than the vinyloxy groups in the organic compound (1). The SiH groups which remain are then required for introduction of the vinyloxy groups into the siloxane copolymer, which takes place by reaction with the organic compound (1) containing vinyloxy groups, some of the vinyloxy groups being consumed by hydrosilylation and the remainder being available for cationic crosslinking in the siloxane copolymer.

The organic compounds (1) and (2) are employed in the process according to the invention in amounts such that the sum of the vinyloxy group in the organic compound (1) and the aliphatic double bond in the organic compound (2) is present in a ratio to the Si-bonded hydrogen in the organic polysiloxane (3) of preferably 1.2 to 20, preferably 1.5 to 5.

Siloxane copolymers which contain vinyloxy groups and have little bridging via the organic compound (1) containing vinyloxy groups are preferably prepared.

The siloxane copolymers according to the invention can also be prepared in a two-stage process. In a 1st stage of this process, the organic compound (2) containing aliphatic double bonds is reacted with the organopolysiloxane (3) in the presence of the catalyst (4), and in a 2nd stage, the siloxane copolymer obtained in the 1st stage, which contains Si-bonded hydrogen atoms, is reacted with the organic compound (1) containing vinyloxy groups in the presence of the catalyst (4). In the two-stage process, it is also important that the ratio of aliphatic double bond in the organic compound (2) to Si-bonded hydrogen in the organopolysiloxane (3) in the 1st stage is always less than 1.0, preferably 0.10 to 0.95, preferably 0.30 to 0.80.

Small amounts of free terminal C=C double bonds from the organic compound (2) which have not reacted with the SiH groups may be present in the siloxane copolymers according to the invention. These free "ene" groups cause no trouble. In the case of allyloxy groups, they can be converted into similarly cationically crosslinkable 1-propenoxy groups, as described in the abovementioned DE-A 40 02 922.

The reaction of the organic compound (1), such as triglycol divinyl ether, and the organic compound (2), such as tetraallyloxyethane, with the organopolysiloxane (3), such as α,ω-dihydridodimethytpolysiloxane, in the presence of the catalyst (4) proceeds in accordance with the following (idealised) equation:

complexes, platinum-alcohol complexes, platinum-alcoholate complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, such as platinum-1,3-divinyl-1,1,3,3-tetramethyldisiloxane complexes with or without a content of detectable inorganically bonded halogen, bis-(gammapicoline)-platinum dichloride, trimethylenedipyridine-platinum dichloride, dicyctopentadiene-platinum dichloride, dimethyl sulphoxide-ethylene-platinum(II) dichloride and reaction products of platinum tetrachloride with an olefin and primary amine or secondary amine or a primary and secondary amine according to U.S. Pat. No. 4,292,434, such as the reaction product of platinum tetrachloride dissolved in t-octene with sec-butylamine, and ammonium-platinum complexes according to EP-B 110 370, and compounds and complexes of rhodium, such as the rhodium complexes according to EP-A 476 426.

The catalyst (4) is preferably employed in amounts of 2 to 1000 ppm by weight (parts by weight per million parts by weight), preferably in amounts of 10 to 50 ppm by weight, in each case calculated as elemental platinum and based on the total weight of organic compounds (1) and (2) and organopolysiloxane (3).

The process according to the invention is preferably carried out under the pressure of the surrounding atmosphere, that is to say under about 1020 hPa (absolute), but it can also be carried out under higher or lower pressures. Furthermore, the process according to the invention is preferably carried out at a temperature of 50° C. to 170° C. preferably 80° C. to 150° C.

Inert, organic solvents can be co-used in the process according to the invention, although the co-use of inert

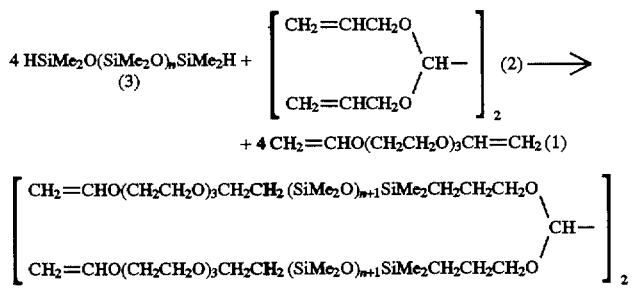

Bridging via (1) can be suppressed by an excess of the organic compound (1). In real reaction systems, further bridging of (2) via (3) usually takes place, so that, for example, units of the formula (VT) are present, and bridging of (1) via (3) takes place, so that, for example, units of the formula (III) are present.

Catalysts (4) which promote the addition of Si-bonded hydrogen onto an aliphatic multiple bond and which can be employed in the process according to the invention are also the same catalysts which it has also been possible to employ to date for promoting addition of Si-bonded hydrogen onto an aliphatic double bond. The catalysts (4) are preferably a metal from the group of platinum metals or a compound or a complex from the group of platinum metals. Examples of such catalysts are metallic and finely divided platinum, which can be on supports, such as silicon dioxide, aluminium oxide or active charcoal, compounds and complexes of platinum, such as platinum halides, for example $PtCl_4$, $H_2PtCl_6 \cdot 6H_2O$ or $Na_2PtCl_4 \cdot 4H_2O$, platinum-olefin organic solvents is not preferred. Examples of inert organic solvents are toluene, xylene, octane isomers, butyl acetate, 1,2-dimethoxyethane, tetrahydrofuran and cyclohexane.

Excess organic compound (1) and any inert organic solvent which has been co-used are preferably removed by distillation from the siloxane copolymers prepared by the process according to the invention and containing vinyloxy groups. The excess organic compound (1) can also be left in the siloxane copolymer.

The siloxane copolymers prepared by the process according to the invention and containing vinyloxy groups are equilibrated with an organopolysiloxane (5), if appropriate.

Organopolysiloxanes (5) which are used are preferably those chosen from the group comprising linear organopolysiloxanes containing terminal triorganosiloxy groups, of the formula $$R_3SiO(SiR_2O)_rSiR_3$$

wherein R has the meaning given above for this radical and r is 0 or an integer having a value from 1 to 1500, linear organopolysiloxanes containing terminal hydroxyl groups, of the formula

wherein R has the meaning given above for this radical and s is an integer having a value from 1 to 1500, cyclic organopolysiloxanes of the formula

wherein R has the meaning given above for this radical and t is an integer from 3 to 12, and copolymers of units of the formula

wherein R has the meaning given above for this radical.

The ratio of the amounts of the organopolysiloxane (5) employed in the equilibration which is to be carried out if appropriate and the siloxane copolymers containing vinyloxy groups is determined merely by the desired content of vinyloxy groups in the siloxane copolymers produced by the equilibration which is carried out if appropriate and by the desired average chain length.

Basic catalysts which promote the equilibration are preferably employed in the equilibration which is carried out if appropriate. Examples of such catalysts are alkali metal hydroxides, such as sodium hydroxide and potassium hydroxide, trimethylbenzylammonium hydroxide and tetramethylammonium hydroxide. Alkali metal hydroxides are preferred. Alkali metal hydroxides are preferably used in amounts of 50 to 10,000 ppm by weight (=parts per million), in particular 500 to 2000 ppm by weight, in each case based on the total weight of siloxane copolymer containing vinyloxy groups employed and organopolysiloxane (5) employed. Although it is possible to use acid equilibration catalysts, this is not preferred.

The equilibration which is carried out if appropriate is preferably carried out at 100° C. to 150° C. under the pressure of the surrounding atmosphere, that is to say at about 1020 hPa (absolute). If desired, however, higher or lower pressures can also be used. The equilibration is preferably carried out in a concentration of 5 to 20% by weight, based on the total weight of the particular siloxane copolymer containing vinyloxy groups employed and organopolysiloxane (5) employed, in a water-immiscible solvent, such as toluene. The catalyst can be rendered inactive before the mixture obtained in the equilibration is worked up.

The process according to the invention can be carried out batchwise, semi-continuously or completely continuously.

The siloxane copolymers according to the invention which contain vinyloxy groups can be crosslinked cationically, for example by addition of acids, such as hydrochloric acid, sulphuric acid or p-toluenesulphonic acid. The siloxane copolymers according to the invention which contain vinyloxy groups are preferably crosslinked in a cationic polymerisation initiated by light. Catalysts which are used for the crosslinking initiated by light are preferably onium salts, such as diaryliodonium salts or triarylsulphonium salts, which are known from EP-B 105 341 and the German application by the Applicant Company having the application number P 41 42 327.5. Examples of such onium salts are the bis-(dodecylphenyl)iodonium salts described in EP-B 105 341, such as bis-(dodecylphenyl)iodonium hexafluoroantimonate or bis-(dodecylphenyl)iodonium hexafluoroarsenate, or the iodonium salts of the formula

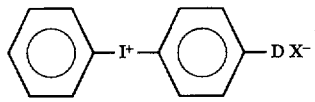

wherein D denotes a radical of the formula

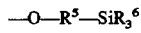

wherein $R^5$ denotes a divalent hydrocarbon radical having 1 to 18 carbon atoms per radical, which is optionally interrupted by at least one oxygen atom and/or one sulphur atom and/or one carboxyl group, $R^6$ denotes a monovalent hydrocarbon radical having 1 to 18 carbon atoms per radical, which is optionally interrupted by at least one oxygen atom, and $X^-$ is a tosylate anion or a weakly nucleophilic or non-nucleophilic anion $Y^-$ chosen from the group comprising $CF_3CO_2^-$, $BF_4^-$, $PF_6^-$, $AsF_6^-$, $SbF_6^-$, $ClO_4^-$, $HSO_4^-$, $CF_3SO_3^-$ and $C_4F_9SO_3^-$, which are described in the German application having the application number P 41 42 327.5.

The invention therefore relates to the use of siloxane copolymers containing vinyloxy groups, preferably comprising units of the formula (I), (II), if appropriate at least one of the units of the formula (III), (IV) or (V) and at least one of the units of the formula (VI), preferably comprising units of the formula (I'), (II'), (III') and (VI'), in compositions which can be crosslinked by light and are based on the above-mentioned siloxane copolymers.

The siloxane copolymers according to the invention which contain vinyloxy groups are preferably cross-linked by ultraviolet light, that having wavelengths in the range from 200 to 400 nm being preferred. The ultra-violet light can be generated, for example, in xenon or low, medium or high pressure mercury lamps. Ultraviolet light having a wavelength of 400 to 600 nm, that is to say so-called "halogen light" is also suitable for the crosslinking by light. The siloxane copolymers according to the invention which contain vinyloxy groups can be crosslinked by light in the visible range if commercially available photosensitisers are also used.

The cationic polymerisation of the siloxane copolymers according to the invention which contain vinyloxy groups can of course also be initiated by Brönsted or Lewis acids customary for this purpose.

Finally, the invention also relates to the use of the siloxane copolymers according to the invention which contain vinyloxy groups for the preparation of coatings which can be crosslinked by light.

The siloxane copolymers according to the invention which contain vinyloxy groups can be used in radiation-curing printing inks.

Examples of surfaces onto which the coatings according to the invention can be applied are those of paper, wood, cork, films of plastic, for example polyethylene films or polypropylene films, ceramic objects, glass, including glass fibres, metals, pasteboard, including that of asbestos, and woven and non-woven cloth of naturally occurring or synthetic organic fibres.

The application of the siloxane copolymers according to the invention which contain vinyloxy groups to the surfaces to be coated can be carried out in any desired manner which is suitable and in many cases known for the production of coatings from liquid substances, for example by dipping, brushing, pouring, spraying, rolling, printing, for example by means of an offset gravure coating device, or knife or doctor blade coating.

EXAMPLE 1

16 g of tetraallyloxyethane and 76 g of triglycol divinyl ether are mixed with 238 g of a copolymer of hydridodimethylsiloxane and dimethylsiloxane units having a viscosity of 11 mm$^2 \cdot$s$^{-1}$ at 25° C., which contains 0.50 g of Si-bonded hydrogen, and the mixture is heated to about 80° C. under a nitrogen atmosphere. The ratio of the allyl groups to the SiH groups is 0.5 and the ratio of the sum of the allyl and vinyl groups (C=C) to the SiH groups, C=C/SiH, is 2.0. 4 mg of platinum in the form of hexachloroplatinic acid, dissolved in isopropanol, are added to the heated mixture, after which an internal temperature of almost 150° C. is reached. A polymer having a viscosity of 220 mm$^2 \cdot$s$^{-1}$ at 25° C. is obtained; the amount of the content of hydrogen which can be split off shows a conversion of more than 99%. The divinyl ether which has not been consumed (about 25 g) is separated off in vacuo at 10° C., after which the polymer has a viscosity of 450 mm$^2 \cdot$s$^{-1}$ at 25° C. and the $^1$H-NMR spectrum shows a ratio of CH$_2$=CH-O/SiCH$_2$CH$_2$O of 1.04. No free allyloxy groups are detectable. The polymer has a double bond equivalent (vinyloxy groups) of about 1200 and a siloxane content of about 78% by weight.

EXAMPLE 2

6 mg of platinum in the form of a solution of the platinum-1,3-divinyl-1,1,3,3-tetramethyldisiloxane complex are added to a mixture of 56 g of acetylated pentaerythritol triallyl ether and 121 g of triglycol divinyl ether, and the mixture is heated to 100° C. under a nitrogen atmosphere. 147 g of an α,ω-dihydridodimethyl-polysiloxane which contains 0.68% by weight of Si-bonded hydrogen are added dropwise to this solution, which contains a total of 1.8 mol of C=C double bonds, and the mixture is allowed to react until a conversion of more than 98% is reached. Excess divinyl ether is distilled off in vacuo, after which a polymer having a viscosity of 290 mm$^2 \cdot$s$^{-1}$ at 25° C. is obtained. The $^1$H-NMR spectrum shows a ratio of CH$_2$=CHO/SiCH$_2$CH$_2$O of 1.06, allyloxy groups no longer being detectable. The polymer has a double bond equivalent of about 700 and a siloxane content of about 52 % by weight.

EXAMPLE 3

10 g of the polymer prepared in Example 2 are mixed with 0.1 g of [4-[2-(3-tributylsilylpropyloxy)ethoxy]phenyl] phenyliodonium hexafluoroantimonate (preparation of which is described in the German application having the application number P 41 42 327.5) and the mixture is spread in a thin layer of about 4 μm onto polyethylene-coated paper using a glass rod. Curing is carried out by means of a medium pressure mercury lamp (80 watt/cm) at a distance of 10 cm after an exposure time of 0.2 seconds.

We claim:

1. Siloxane copolymers containing vinyloxy groups and comprising:

(a) siloxane units of the formula

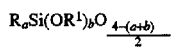  (I)

wherein R denotes identical or different, optionally halogenated hydrocarbon radicals having 1 to 18 carbon atoms per radical, R$^1$ denotes identical or different alkyl radicals having 1 to 4 carbon atoms per radical, optionally containing an ether oxygen atom, a is 0, 1, 2 or 3, b is 0, 1, 2 or 3 and the sum of a+b is not greater than 3, (b) at least one unit per molecule chosen from the group consisting of units of the formula

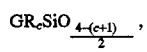  (II)

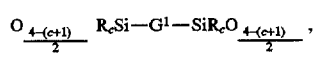  (III)

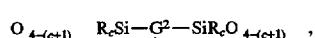  (IV)

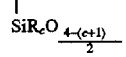

and

  (V)

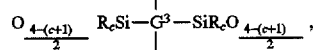

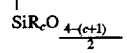

wherein R has the meaning given above for this radical, c is 0, 1 or 2,

G denotes a radical of the formula

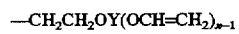

wherein

Y denotes a divalent, trivalent, or tetravalent hydrocarbon radical having 1 to 20 carbon atoms per radical, optionally substituted by groups of the formula

—OH

—OR$^3$ wherein R$^3$ denotes an alkyl radical having 1 to 6 carbon atoms per radical, —OSiR$_3^4$ wherein R$^4$ denotes a methyl, ethyl, isopropyl, tert-butyl or phenyl radical,

wherein R$^3$ has the meaning given above for this radical, or

—X wherein X denotes a halogen atom or is optionally interrupted by at least one oxygen atom, one carboxyl or one carbonyl group, and x is 2, 3 or 4, G$^1$ denotes a radical of the formula

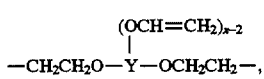

$G^2$ denotes a radical of the formula $$-CH_2CH_2O-\underset{\underset{OCH_2CH_2-}{|}}{\overset{\overset{(OCH=CH_2)_{x-3}}{|}}{Y}}-OCH_2CH_2-,$$

and $G^3$ denotes a radical of the formula $$-CH_2CH_2O-\underset{\underset{OCH_2CH_2-}{|}}{\overset{\overset{OCH_2CH_2-}{|}}{Y}}-OCH_2CH_2-$$

wherein Y and x have the meaning given above for these symbols,
and (c) at least one unit per molecule of the formula $$O_{\frac{4-(c+1)}{2}}R_cSi-\underset{\underset{\left\{SiR_cO_{\frac{4-(c+1)}{2}}\right\}_{y-2}}{|}}{L}-SiR_cO_{\frac{4-(c+1)}{2}}, \quad (VI)$$

wherein R and c have the meaning given above for these symbols and
L denotes a radical of the formula $$-CH_2CHR^2(CHR^2O)_u-Z-\overset{\overset{\{(OCHR^2)_uCHR^2CH_2-\}_{y-2}}{|}}{(OCHR^2)_uCHR^2CH_2-}$$

wherein

Z is a divalent, trivalent, tetravalent, pentavalent, or hexavalenthydrocarbon radical having 2 to 20 carbon atoms per radical, optionally substituted by groups of the formula
—OH
—$OR^3$ wherein $R^3$ denotes an alkyl radical having 1 to 6 carbon atoms per radical,
—$OSiR_3^4$ wherein $R^4$ denotes a methyl ethyl, isopropyl, tert-butyl or phenyl radical,
—$OCR^3$ wherein $R^3$ has the meaning given above for this radical, or
—X wherein X denotes a halogen atom
or optionally is interrupted by at least one oxygen atom, one carboxyl or one carbonyl group,
$R^2$ denotes a hydrogen atom or an alkyl radical having 1 to 6 carbon atoms per radical,
u denotes 0 or 1 and
y denotes 2, 3, 4, 5 or 6.

2. Siloxane copolymers containing vinyloxy groups, according to claim 1, characterised in that the siloxane units of the formula (I) contain, per molecule, at least one siloxane unit of the formula (II) and, per molecule, at least one unit of the formula (VI).

3. Siloxane copolymers containing vinyloxy groups, according to claim 2, characterized in that they comprise:

(a) siloxane units of the formula $$R_2SiO, \quad (I)$$

(b) per molecule, at least two siloxane units of the formula $$GR_2SiO_{1/2} \quad (II')$$

and (c) per molecule, at least one unit of the formula $$O_{1/2}R_2Si-\underset{\underset{(SiR_2O_{1/2})_{y-2}}{|}}{L}-SiR_2O_{1/2} \quad (VI')$$

wherein R denotes identical or different, optionally halogenated hydrocarbon radicals having 1 to 18 carbon atoms per radical, G denotes a radical of the formula $$-CH_2CH_2OY(OCH=CH_2)_{x-1},$$

wherein

Y denotes a divalent, trivalent or tetravalent hydrocarbon radical having 1 to 20 carbon atoms per radical, which is optionally substituted by
groups of the formula
—OH
—$OR^3$ wherein $R^3$ denotes an alkyl radical having 1 to 6 carbon atoms per radical,
—$OSiR_3^4$ wherein $R^4$ denotes a methyl, ethyl, isopropyl, tert-butyl or phenyl radical, $$-\underset{O}{\overset{\overset{}{\|}}{O}CR^3}$$

wherein $R^3$ has the meaning given above for this radical, or
—X wherein X denotes a halogen atom
or is optionally interrupted by at least one oxygen atom, carboxyl group, or carbonyl group, and
x denotes 2, 3 or 4, and L denotes a radical of the formula $$-CH_2CHR^2(CHR^2O)_u-Z-\overset{\overset{\{(OCHR^2)_uCHR^2CH_2-\}_{y-2}}{|}}{(OCHR^2)_uCHR^2CH_2-,}$$

wherein

Z is a divalent, trivalent, tetravalent, pentavalent or hexavalent hydrocarbon radical having 2 to 20 carbon atoms per radical, which is optionally substituted by groups of the formula
—OH
—$OR^3$ wherein $R^3$ denotes an alkyl radical having 1 to 6 carbon atoms per radical,
—$OSiR_3^4$ wherein $R^4$ denotes a methyl, ethyl, isopropyl, tert-butyl or phenyl radical $$-\underset{O}{\overset{\overset{}{\|}}{O}CR^3}$$

wherein $R^3$ has the meaning given above for this radical, or
—X wherein X denotes a halogen atom
or is optionally interrupted by at least one oxygen atom, one carboxyl or one carbonyl group,
$R^2$ denotes a hydrogen atom or an alkyl radical having 1 to 6 carbon atoms per radical,
u denotes 0 or 1, and
y denotes 2, 3, 4, 5 or 6.

4. Process for the preparation of liquid, curable siloxane copolymers containing vinyloxy groups, characterized in that an organic compound (1) containing vinyloxy groups, of the general formula $$Y(OCH=CH_2)_x \quad (1)$$

wherein

Y denotes a divalent, trivalent, or tetravalent hydrocarbon radical having 1 to 20 carbon atoms per radical, which can be substituted by groups of the formula
—OH
—$OR^3$ wherein $R^3$ denotes an alkyl radical having 1 to 6 carbon atoms per radical,
—$OSiR_3^4$ wherein $R^4$ denotes a methyl, ethyl, isopropyl, tert-butyl or phenyl radical, $$-\underset{O}{\overset{\Vert}{O C R^3}}$$

wherein $R^3$ has the meaning given above for this radical, or
—X wherein X denotes a halogen atom, or is optionally interrupted by at least one oxygen atom, one carboxyl group or one carbonyl group, and x is 2, 3 or 4, and an organic compound (2) containing aliphatic double bonds, of the formula $$Z\{(OCHR^2)_uCR^2=CH_2\}_y \quad (2)$$

wherein

Z denotes a divalent, trivalent, tetravalent, pentavalent or hexavalent hydrocarbon radical having 2 to 20 carbon atoms per radical, which can be substituted by groups of the formula
—OH
—$OR^3$ wherein $R^3$ denotes an alkyl radical having 1 to 6 carbon atoms per radical,
—$OSiR_3^4$ wherein $R^4$ denotes a methyl, ethyl, isopropyl, tert-butyl or phenyl radical, $$-\underset{O}{\overset{\Vert}{O C R^3}}$$

wherein $R^3$ has the meaning given above for this radical, or
—X wherein X denotes a halogen atom or is optionally interrupted by at least one oxygen atom, one carboxyl group, or one carbonyl group,
$R^2$ denotes a hydrogen atom or an alkyl radical having 1 to 6 carbon atoms per radical,
u denotes 0 or 1, and
y denotes 2, 3, 4, 5 or 6, are reacted with an organopolysiloxane (3) having on average more than one Si-bonded hydrogen atom per molecule, in the presence of a catalyst (4) which promotes the addition of Si-bonded hydrogen onto an aliphatic double bond, the organic compounds (1) and (2) being employed in amounts such that the ratio of the sum of aliphatic double bonds in the organic compounds (1) and (2) to Si-bonded hydrogen in the organopolysiloxane (3) is greater than 1.0, with the proviso that the ratio of aliphatic double bond in the organic compound (2) to Si-bonded hydrogen in the organopolysiloxane (3) is less than 1.0;

said siloxane copolymers comprising:

(a) siloxane units of the formula $$R_aSi(OR^1)_bO_{\frac{4-(a+b)}{2}} \quad (I)$$

wherein R denotes identical or different, optionally halogenated hydrocarbon radicals having 1 to 18 carbon atoms per radical,
$R^1$ denotes identical or different alkyl radicals having 1 to 4 carbon atoms per radical, optionally containing an ether oxygen atom,
a is 0, 1, 2 or 3,
b is 0, 1, 2 or 3 and the sum of a+b is not greater than 3, (b) at least one unit per molecule chosen from the group consisting of units of the formula $$GR_cSiO_{\frac{4-(c+1)}{2}}, \quad (II)$$

$$O_{\frac{4-(c+1)}{2}}R_cSi-G^1-SiR_cO_{\frac{4-(c+1)}{2}}, \quad (III)$$

$$O_{\frac{4-(c+1)}{2}}R_cSi-\underset{SiR_cO_{\frac{4-(c+1)}{2}}}{\overset{|}{G^2}}-SiR_cO_{\frac{4-(c+1)}{2}}, \quad (IV)$$

and $$O_{\frac{4-(c+1)}{2}}R_cSi-\underset{SiR_cO_{\frac{4-(c+1)}{2}}}{\overset{\overset{SiR_cO_{\frac{4-(c+1)}{2}}}{|}}{G^3}}-SiR_cO_{\frac{4-(c+1)}{2}}, \quad (V)$$

wherein R has the meaning given above for this radical,
c is 0, 1 or 2,
G denotes a radical of the formula $$-CH_2CH_2OY(OCH=CH_2)_{x-1}$$

wherein

Y denotes a divalent, trivalent, or tetravalent hydrocarbon radical having 1 to 20 carbon atoms per radical, optionally substituted by groups of the formula
—OH
—$OR^3$ wherein $R^3$ denotes an alkyl radical having 1 to 6 carbon atoms per radical,
—$OSiR_3^4$ wherein $R^4$ denotes a methyl, ethyl, isopropyl, tert-butyl or phenyl radical, $$-\underset{O}{\overset{\Vert}{O C R^3}}$$

wherein $R^3$ has the meaning given above for this radical, or
—X wherein X denotes a halogen atom or is optionally interrupted by at least one oxygen atom, one carboxyl or one carbonyl group, and
x is 2, 3 or 4,
$G^1$ denotes a radical of the formula $$-CH_2CH_2O-Y-\underset{|}{\overset{(OCH=CH_2)_{x-2}}{}}OCH_2CH_2-,$$

$G^2$ denotes a radical of the formula

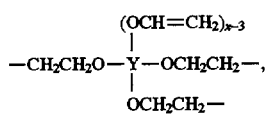

and
$G^3$ denotes a radical of the formula

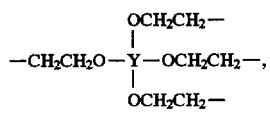

wherein Y and x have the meaning given above for these symbols,
and
(c) at least one unit per molecule of the formula

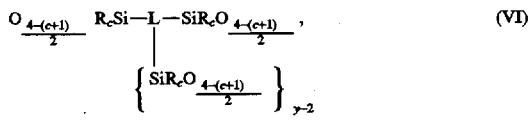 (VI)

wherein R and c have the meaning given above for these symbols and
L denotes a radical of the formula

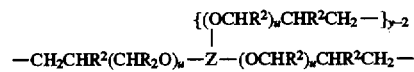

wherein
Z is a divalent, trivalent, tetravalent, pentavalent, or hexavalent hydrocarbon radical having 2 to 20 carbon atoms per radical, optionally substituted by groups of the formula
—OH
—$OR^3$ wherein $R^3$ denotes an alkyl radical having 1 to 6 carbon atoms per radical,
—$OSiR_3^4$ wherein $R^4$ denotes a methyl, ethyl, isopropyl, tert-butyl or phenyl radical,
—$OCR^3$ wherein $R^3$ has the meaning given above for this radical, or
—X wherein X denotes a halogen atom or optionally is interrupted by at least one oxygen atom, one carboxyl or one carbonyl group,
$R^2$ denotes a hydrogen atom or an alkyl radical having 1 to 6 carbon atoms per radical,
u denotes 0 or 1 and
y denotes 2, 3, 4, 5 or 6.

5. Process according to claim 4, characterised in that

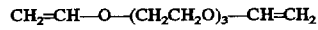

is used as the organic compound (1).

6. Process according to claim 4, characterised in that

is used as the organic compound (2).

7. Process according to claim 4, characterised in that the organopolysiloxane (3) having on average more than one Si-bonded hydrogen atom per molecule which is used is one of the general formula

 (VIII)

wherein R denotes identical or different, optionally halogenated hydrocarbon radicals with 1 to 18 carbon atom(s) per radical,
d is identical or different and is 0 or 1,
o denotes 0 or an integer from 1 to 1000 and
p denotes 0 or an integer from 1 to 6.

8. Process according to claim 4, wherein the resulting siloxane copolymer containing vinyloxy groups is equilibrated with an organopolysiloxane (5) chosen from the group consisting of linear organopolysiloxanes containing terminal triorganosiloxy groups, linear organopolysiloxanes containing terminal hydroxyl groups, cyclic organopolysiloxanes and copolymers of diorganosiloxane and monoorganosiloxane units.

9. Process for the preparation of siloxane copolymers containing vinyloxy groups, characterized in that an organic compound (1) containing vinyloxy groups, of the general formula $$Y(OCH=CH_2)_x \quad (1)$$

wherein
Y denotes a divalent, trivalent, or tetravalent hydrocarbon radical having 1 to 20 carbon atoms per radical, which can be substituted by groups of the formula
—OH
—$OR^3$ wherein $R^3$ denotes an alkyl radical having 1 to 6 carbon atoms per radical,
—$OSiR_3^4$ wherein $R^4$ denotes a methyl, ethyl, isopropyl, tert-butyl or phenyl radical,

wherein $R^3$ has the meaning given above for this radical, or
—X wherein X denotes a halogen atom, or is optionally interrupted by at least one oxygen atom, one carboxyl group or one carbonyl group, and
x is 2, 3 or 4,
and an organic compound (2) containing aliphatic double bonds, of the formula

 (2)

wherein
Z denotes a divalent, trivalent, tetravalent, pentavalent or hexavalent hydrocarbon radical having 2 to 20 carbon atoms per radical, which can be substituted by groups of the formula
—OH
—$OR^3$ wherein $R^3$ denotes an alkyl radical having 1 to 6 carbon atoms per radical,
—$OSiR_3^4$ wherein $R^4$ denotes a methyl, ethyl, isopropyl, tert-butyl or phenyl radical,

wherein $R^3$ has the meaning given above for this radical, or
—X wherein X denotes a halogen atom or is optionally interrupted by at least one oxygen atom, one carboxyl group, or one carbonyl group, $R^2$ denotes a hydrogen atom or an alkyl radical having 1 to 6 carbon atoms per radical, u denotes 0 or 1, and y denotes 2, 3, 4, 5 or 6, are reacted with an organopolysiloxane (3) having on average more than one Si-bonded hydrogen atom per molecule, in the presence of a catalyst (4) which promotes the addition of Si-bonded hydrogen onto an aliphatic double bond, the organic compounds (1) and (2) being employed in amounts such that the ratio of the sum of aliphatic double bonds in the organic compounds (1) and (2) to Si-bonded hydrogen in the organopolysiloxane (3) is greater than 1.0, with the proviso that the ratio of aliphatic double bond in the organic compound (2) to Si-bonded hydrogen in the organopolysiloxane (3) is less than 1.0;

wherein said organopolysiloxane (3) having on average more than one Si-bonded hydrogen atom per molecule which is used comprises one of the general formula

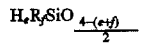

wherein R denotes identical or different, optionally halogenated hydrocarbon radicals with 1 to 18 carbon atom(s) per radical, e is 0 or 1, f is 0, 1, 2, or 3, and wherein the sum of e and f is 3 or less.

10. The process of claim 9 wherein said organopolysiloxane (3) comprises

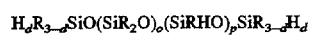

wherein d is identical or different and is 0 or 1, o denotes 0 or an integer from 1 to 1000, and p denotes 0 or an integer from 1 to 6.

11. A composition capable of being crosslinked by light comprising the composition as claimed in claim 1.

12. A light crosslinkable coating comprising the composition as claimed in claim 1.

* * * * *